United States Patent
Khanna et al.

(10) Patent No.: US 11,025,061 B2
(45) Date of Patent: Jun. 1, 2021

(54) PREDICTIVE POWER USAGE MONITORING

(71) Applicant: ACCENTURE GLOBAL SOLUTIONS LIMITED, Dublin (IE)

(72) Inventors: Paresh Khanna, Pathankot (IN); Senthil Nathan Shanmuga Pathar, Thanjavur (IN); Anupriya Munjal, Gurgaon (IN); Lukish Rajesh Yadav, Pune (IN); Nishi Sharma, Noida (IN); Ketan Nandlal Shah, Mumbai (IN)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 183 days.

(21) Appl. No.: 16/368,279

(22) Filed: Mar. 28, 2019

(65) Prior Publication Data

US 2020/0313434 A1    Oct. 1, 2020

(51) Int. Cl.
*H02J 3/14* (2006.01)
*H02J 3/00* (2006.01)

(52) U.S. Cl.
CPC .......... *H02J 3/14* (2013.01); *H02J 3/003* (2020.01)

(58) Field of Classification Search
CPC ...................................................... H02J 3/003
See application file for complete search history.

(56) References Cited

U.S. PATENT DOCUMENTS 10,756,919 B1* 8/2020 Kerzner ............ H04L 12/2827

2012/0004872 A1* 1/2012 Oh ..................... G01D 3/10
702/62

(Continued)

FOREIGN PATENT DOCUMENTS

| CN | 107239852 A | 10/2017 |
| CN | 109034497 A | 12/2018 |
| WO | 2018/161723 A1 | 9/2018 |

OTHER PUBLICATIONS

Kazuma Hashimoto, et at., "A Joint Many-Task Model: Growing a Neural Network for Multiple NLP Task", Proceedings of the 2017 Conference on Empirical Methods in Natural Language Processing, Sep. 7-11, 2017, 15 pages, Copenhagen, Denmark.

(Continued)

*Primary Examiner* — Nathan L Laughlin
(74) *Attorney, Agent, or Firm* — Mannava & Kang, P.C.

(57) ABSTRACT

A power usage prediction system implements a long short term memory (LSTM) neural network to receive power usage inputs and generate predicted values of power consumption for a plurality of devices. A user provides configuration input regarding the time steps at which the predicted values are to be generated and the various devices for which the predicted values of power consumption are desired. Whenever a power usage input is received, the LSTM neural network outputs the corresponding hidden state values for a plurality of time steps as the predicted values. The hidden state values are each compared to a final cell state value corresponding to a power consumption threshold of the time interval which includes the time steps. Based on the comparison, a power usage condition is recorded. Various actions to mitigate the high power consumption can be implemented in response to recording the power usage condition.

19 Claims, 9 Drawing Sheets

(56) References Cited

U.S. PATENT DOCUMENTS

| | | | |
|---|---|---|---|
| 2014/0244054 A1* | 8/2014 | Sato | H02J 3/14 |
| | | | 700/286 |
| 2017/0089625 A1* | 3/2017 | Wallace | F25B 49/022 |
| 2019/0019080 A1* | 1/2019 | Claessens | G05B 13/027 |
| 2019/0228481 A1* | 7/2019 | Tella | G06N 3/08 |
| 2019/0266475 A1* | 8/2019 | Wierstra | G06N 3/0445 |
| 2020/0028703 A1* | 1/2020 | Homsi | G06N 3/08 |
| 2020/0076196 A1* | 3/2020 | Lee | H02J 3/32 |

OTHER PUBLICATIONS

Anonymous: "Remote administration" Wikipedia, Mar. 2, 2015, 4 pages.

Christopher Olah, "Understanding LSTM Networks—colah's blog", Aug. 27, 2015, 6 pages.

\* cited by examiner

FIG. 9

PREDICTIVE POWER USAGE MONITORING

BACKGROUND

The power generation industry has gone through many changes over the last few decades. While the demand for energy has risen exponentially with the growth of the various regions across the globe, newer advances in industrial processes have enabled discovery and usage of multiple energy sources which can include renewable and non-renewable sources. While energy storage has emerged as a major challenge for renewable sources, energy conservation and efficient use of existing energy or power resources contribute to extending the lifetime of existing non-renewable energy resources. One of the common reasons for wastage of energy is human error. Failures to switch off electrical equipment after usage or failing to thoroughly check equipment for safety and maintenance issues lead to such wastage and equipment breakdowns. Energy conservation is the means to reduce the quantity of energy that is used for different purposes. The practice may result in increase of financial capital, environmental value, national and personal security, and human comfort.

BRIEF DESCRIPTION OF DRAWINGS

Features of the present disclosure are illustrated by way of examples shown in the following figures. In the following figures, like numerals indicate like elements, in which.

DETAILED DESCRIPTION

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

A power usage prediction system receives power usage inputs from a plurality of devices associated with an entity and generates predictions regarding power consumption for future time steps using a trained machine learning based model. The power usage is determined based on comparisons of predicted values of the power consumption with the corresponding power consumption thresholds. A predicted value for power consumption includes the number of units of power expected to be consumed by one or more of the plurality of devices within a given time interval. A user associated with the plurality of devices can be alerted if high power consumption is predicted in order to take appropriate actions to conserve power and maintain safety. The plurality of devices can include smart electrical and electronic appliances which are associated with network addresses and connected to the internet. In an example, the plurality of devices implement the internet of things (IoT) network. The power usage prediction system receives configuration input from the user in order to identify various settings and attributes which can include but are not limited to the network identifiers of the plurality of devices which are to be monitored, the power consumption thresholds of the plurality of devices, the time steps at which the predicted values are to be generated and the time intervals at which the notifications regarding the power usage are to be output.

In an example, the prediction system implements a LSTM neural network as the machine learning (ML) model for generating the predicted values of power consumption. The LSTM neural network can be trained on historical data which can include the power consumption data of a plurality of device classes. The LSTM neural network can include a number of layers where the number of layers in the LSTM neural network is a hyper parameter of the model which can be empirically determined. Each layer of the LSTM neural network includes different stages or multiple memory cells wherein each stage includes a respective memory cell. The number of cells or stages in a layer corresponds to the number of time steps within a time interval. A given time interval for monitoring the plurality of devices can be divided into a plurality of time steps based on the frequency at which the power data inputs are collected from the plurality of devices by the prediction system. The frequency of collecting the power data inputs is configured by the user as mentioned above. Therefore, the number of cells within a layer of the LSTM neural network can be a user-configurable attribute. For each received input, the cell generates a hidden state value which corresponds to the predicted value for power consumption at that time step. A series of predicted values at different time steps are therefore generated within a given time interval.

In addition to the time steps, the user's configuration input can also include the power consumption thresholds for the plurality of devices. In an example, a power consumption threshold can include a maximum value of the total power that is permitted for consumption or use by the plurality of devices within the time interval. Referring to the trained model or more particularly to the trained LSTM neural network, the power consumption threshold for a time interval corresponds to the cell state of the cell within the particular layer. Alternately, the power consumption threshold for the time interval can correspond to the cell state value of the cell associated with the last time step or the final stage within the layer.

Different time intervals can have different power consumption thresholds. The power consumption threshold for a given time interval can be set by the user based on the power usage specific to the user for that time interval. When a predicted value of power consumption is generated at a time step, the predicted value or hidden state value is compared to the power consumption threshold or the final cell state value of that time interval. If the predicted value is greater than the power consumption threshold, then the predicted value is marked as contributing to a power usage condition. A power usage condition signifies that the plurality of devices are consuming more power than expected by the user or set by the user within the power consumption threshold. While in certain situations a high power consumption may signify a dangerous trend, it can be appreciated that oftentimes such is not the case. Accordingly, the prediction system continues to generate predicted values for power consumption for all the time steps within the time interval prior to alerting the user. In an example, many LSTM neural networks can run in parallel for producing power consumption predictions for different time intervals with different sequences of power data inputs.

Therefore, the remaining predicted values generated for other time steps during the time interval are also compared with the power consumption threshold. The predicted values which are greater than the power consumption threshold are marked as contributing to the power usage condition. At the end of the time interval the number of predicted values exceeding the power consumption threshold are determined as a percentage of the total number of predicted values generated during the time interval. Based on the percentage of predicted values exceeding the power consumption threshold, one of the plurality of power usage conditions which include, an start power usage condition, a high power usage condition and an extreme power usage condition can be selected. If one of the power usage conditions is selected, a notification regarding the selected power usage condition can be transmitted to the user at one of the user's devices. The notification can enable the user to take one or more actions to contain the power usage by one or more of the plurality of devices.

In an example, the user can be allowed to further analyze the power usage in order to identify one or more of the plurality of devices which are consuming high power and driving the plurality of devices as a whole towards the power usage condition. This is made possible by extending the power usage condition to the individual equipment or devices. The device power consumption thresholds for the plurality of devices can be also defined. The device power consumption thresholds can be entered by the user with the configuration input wherein the user enters the time or the extent of usage of each device. Accordingly, the power usage conditions can be determined for each of the devices separately to enable the user to take appropriate action in response to the notification of excess power usage. In an example, the user may change the power consumption threshold or the device power consumption thresholds so that the predicted values no longer signify the power usage condition or excess power usage. Another action that is enabled is the remote switching off of one or more of the plurality of device(s). The notification can include a widget that enables the user to remotely power off a device.

The predictive power usage prediction system enables power consumers, such as households, residential establishments, manufacturing units etc. to continuously monitor their power usage and mitigates wastage of power. Moreover, the various appliances of the consumer are connected under one prediction system thereby providing a centralized, single point of control. The prediction system includes a usage prediction model which is implemented by the LSTM wherein the number of cells in a layer correspond to the time steps as determined by the user. The LSTM constantly receives power data inputs and in response generates the hidden cell state values that are compared to the corresponding thresholds or final/last cell state value. Moreover, the last cell states are based not only on the current power inputs but also include selected elements of historical data due to the nature of the LSTM neural network. As a result, the usage prediction model is not only updated per the current input data but also retains necessary data from the historical inputs. Therefore, while the predicted values may be based on current power inputs, long term memory or historical perspective is also factored in so that the prediction system can retain memory of power usage, for e.g., during the same time last year. Moreover, the user feedback is received each time the user takes action in response to the notifications. Therefore, the LSTM trains itself to help the users have better control on their power consumption trends with intelligent notifications and predictive alerts.

Figure 1:
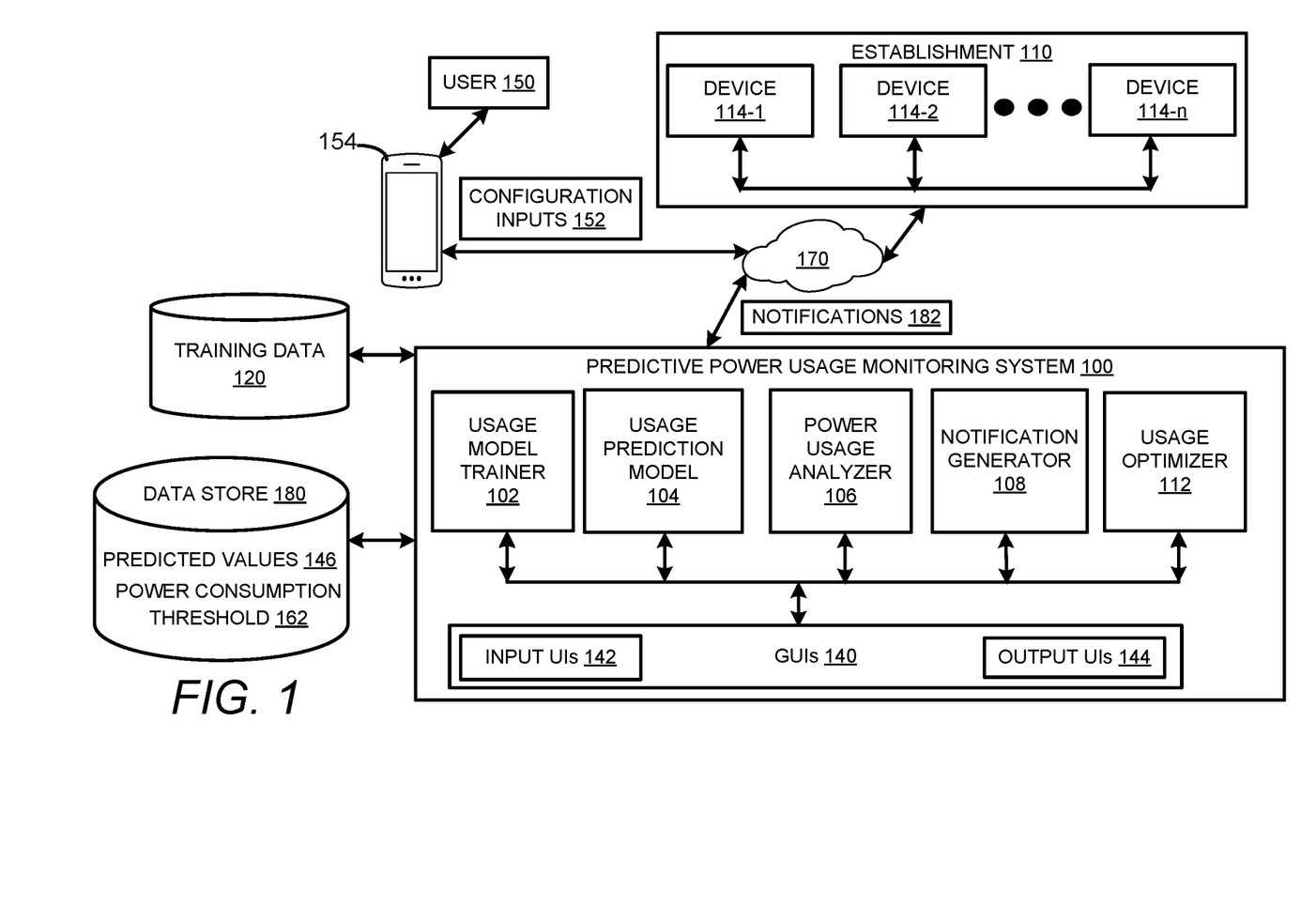
FIG. 1 is a block diagram that shows a power usage prediction system in accordance with examples disclosed herein.

FIG. 1 is a block diagram that shows the predictive power usage prediction system 100 in accordance with examples disclosed herein. The prediction system 100 can be connected via a communication network 170 such as the internet to an establishment 110 with a plurality of devices 114-1, 114-2 . . . 114-$n$ (where n is a natural number) corresponding to an entity such as a customer or user 150 of a power supplying company. In an example, the plurality of devices 114-1 . . . 114-$n$ may be located at different establishments in geographical locations remote from each other. The customer can be a residential or a domestic customer so that the plurality of devices 114-1 . . . 114-$n$ can include household electrical/electronic appliances situated at one or more geographic locations such as but not limited to refrigerators, televisions, washing machines, water heaters, iron boxes, lighting items such as light emitting diodes (LEDs), fans, air conditioners, heating systems and other power consuming items. The entity can include a commercial customer such as a restaurant, a shopping complex or even a manufacturing facility. Accordingly, the plurality of devices 114-1 . . . 114-$n$ can include electrical/electronic appliances employed in such commercial establishments. Regardless of the type of customer, the plurality of devices 114-1 . . . 114-$n$ can be "smart devices" which are directly connected to the network 170. Each of the plurality of devices 114-1 . . . 114-$n$ can include a processor, a data store, a network interface etc. or other elements required for data storage, data processing and data communication functions. Furthermore, each of the plurality of devices 114-1 . . . 114-$n$ can be associated with a network identifier that enables the prediction system 100 to directly access or communicate with the device using the network identifier. In an example, the plurality of devices 114-1 . . . 114-$n$ can implement application programming interfaces (APIs) such as representational state transfer (REST) APIs or simple object access protocol (SOAP) APIs for data exchange. As a result, the power consumption data or the power usage inputs can be obtained directly from each of the plurality of devices 114-1 . . . 114-$n$ by the prediction system 110. The prediction system 100 can also include or be communicatively coupled to a data store 180 which is used to store various persistent and transient values generated and used in the processes as described herein.

The prediction system 100 receives configuration inputs 152 from one or more users associated with such establishments and monitors the power consumption of the establishment in accordance with the received input. Various GUIs 140 are associated with the various elements of the prediction system 100 to enable communication with the users. In an example, the GUIs 140 can include input UIs 142 such as configuration UIs which enable customers to provide configuration inputs from users and output UIs 144 such as dashboards that provide alerts, usage statistics, etc. for users to monitor and adjust their power usage.

The prediction system includes a usage prediction model trainer 102, a usage prediction model 104, a power usage analyzer 106, a notification generator 108 and a usage optimizer 112. The usage prediction model trainer 102 uses training data 120 to train the usage prediction model 104 to identify power usage patterns of the customer and enable generation of notifications for optimizing the usage thereby conserving power. The training data 120 can include historical data regarding the number of units of power consumed by devices of various customers over a period of time. The training data 120 can include power usage data of each of a plurality of device classes at different times during the day and aggregated in different months of a year. The power usage data can include the power data inputs that were collected, the output values which were observed or obtained from the devices of the various device classes at pluralities of time steps included within various time intervals and the corresponding power consumption thresholds that are set based on expected power usages. Each device class can correspond to a particular type of device. For example, refrigerators of different manufacturers and brands can form a device class. Similarly air conditioners, lighting equipment such as LEDs, freezers, ovens and heaters etc. may be categorized into respective device classes. The training data 120 may include power consumption data aggregated through years for each of the device class in predetermined time intervals e.g., slots of 1 hour, 3 hours, 6 hours etc.

The usage prediction model 104 is thus trained for power optimization and conservation on the power consumption data of the various devices classes and for different time intervals aggregated over a period of time. The usage prediction model 104, in an example, can include a LSTM neural network. The LSTM, is a recurrent neural network that is comprised of a plurality of cells with internal gates. Unlike other recurrent neural networks, the network's internal gates allow the model to be trained successfully using backpropagation through time. The usage prediction model 104 generates power consumption predictions for the plurality of devices 114-1 . . . 114-n associated with the customer for particular time slots or time steps for based on the power usage inputs obtained at different time steps over a time period. In an example, the power usage inputs may be analyzed on an aggregated basis so that the total power consumption prediction is compared to the total power consumption threshold. In an example, device power usage inputs corresponding to a specific device class can be analyzed so that the particular device consuming greater power is identified.

The time steps in which to collect the power usage inputs can be obtained from the configuration input 152 provided by the user(s). For example, based on the power usage inputs received from the devices 114-1 . . . 114-n for hourly time steps, a series of predicted values/hidden state values 146 for power usage can be generated by the usage prediction model 104 for the next 3-6 hours. Similarly, power consumption predictions can be generated in 3 hour time steps for every 3-6 hours or 6 hour time steps for the next 3-6 hours based on the configuration input 152.

The predicted values 146 for power usage generated by the usage prediction model 104 can be accessed by the power usage analyzer 106 for identifying if the predicted power usage for the future time steps is in accordance with a final cell state value or a power consumption threshold 162 that is currently valid. The power consumption threshold 162 can include a maximum allowable value of power consumption at any given time step during a particular time interval. Each time interval can be divided into a plurality of time steps. Again, the power consumption threshold 162 can be set based on the configuration inputs 152 from the user 150. The power consumption threshold 162 can be set for specific time periods, for example, for 24 hours so that the predicted power usage values generated at different time steps in the 24 hours are compared with the corresponding power consumption threshold. A different power consumption threshold may be defined by the user for the next 24 hours. Additionally, power consumption thresholds may also be changed within the 24 hours based on the user input in accordance with the examples discussed herein. The power usage analyzer 106 therefore compares the predicted values 146 with the power consumption threshold 162. Based on the comparisons various actions can be executed.

If the predicted values 146 remains within the power consumption threshold 162 then no action is required as the power system and the devices 114-1 . . . 114-n are following normal usage patterns or as expected by the user 150. If, however, the predicted values 146 exceeds the power consumption threshold 162, a power usage condition is detected. Depending on the extent of deviation within the pattern, different levels of power usage conditions can be detected as detailed further infra. When one of the power usage conditions is detected, the notification generator 108 generates a notification 182 to the user 150 to be received at one or more client devices such as the smart phone 154 regarding the deviation of the predicted values 146 from the power consumption threshold 162 thereby indicating a spike in the power usage.

Based on the user's response, the usage optimizer 112 can implement various actions. The user's response to the notification 182 is received at the usage optimizer 112 for analysis and execution of the required actions. Again, any action taken by the user 150 can again be recorded as feedback to train the usage prediction model 104. In an example, the user 150 may not take any action despite the predicted values 146 deviating from the power consumption threshold 162. For example, if the user 150 is aware of the reason for the spike in the power usage, the user 150 may ignore the notification 182 and may not take any action. In an example, the user's ignore action can be used to adjust the power consumption threshold or the final cell state value 162 to a newer, higher value. In an example, the LSTM neural network can be trained on further training data for generating the prediction values regarding the power consumption of each of the plurality of device classes at each of a plurality of time steps where the further training data is based on the adjusted device power consumption threshold—the newer, higher value. Further power consumption predictions can be generated for subsequent time steps and each of the further power consumption predictions for the subsequent time steps can be compared with the adjusted device power consumption threshold. One of the plurality of power usage conditions for the devices is selected based on a comparison with the adjusted device power consumption threshold.

Therefore, during the next time step, a notification will be generated only if the predicted value exceeds the newer, higher value of the power consumption threshold 162. In an example, the user 150 can research for further power usage data based on the notification 182 via the output GUIs 144 such as the dashboards which can be displayed on the client device such as the smart phone 154. The output GUIs 144 can further enable the user to take emergency action such as switching off a particular device of the plurality of devices 114-1 . . . 114-n remotely via the smart phone 154. In an example, the GUIs 140 can implement text-to-speech translations and voice enabled communication for ease of accessibility, understanding and controlling utility applications by means of IoT.

Figure 2:
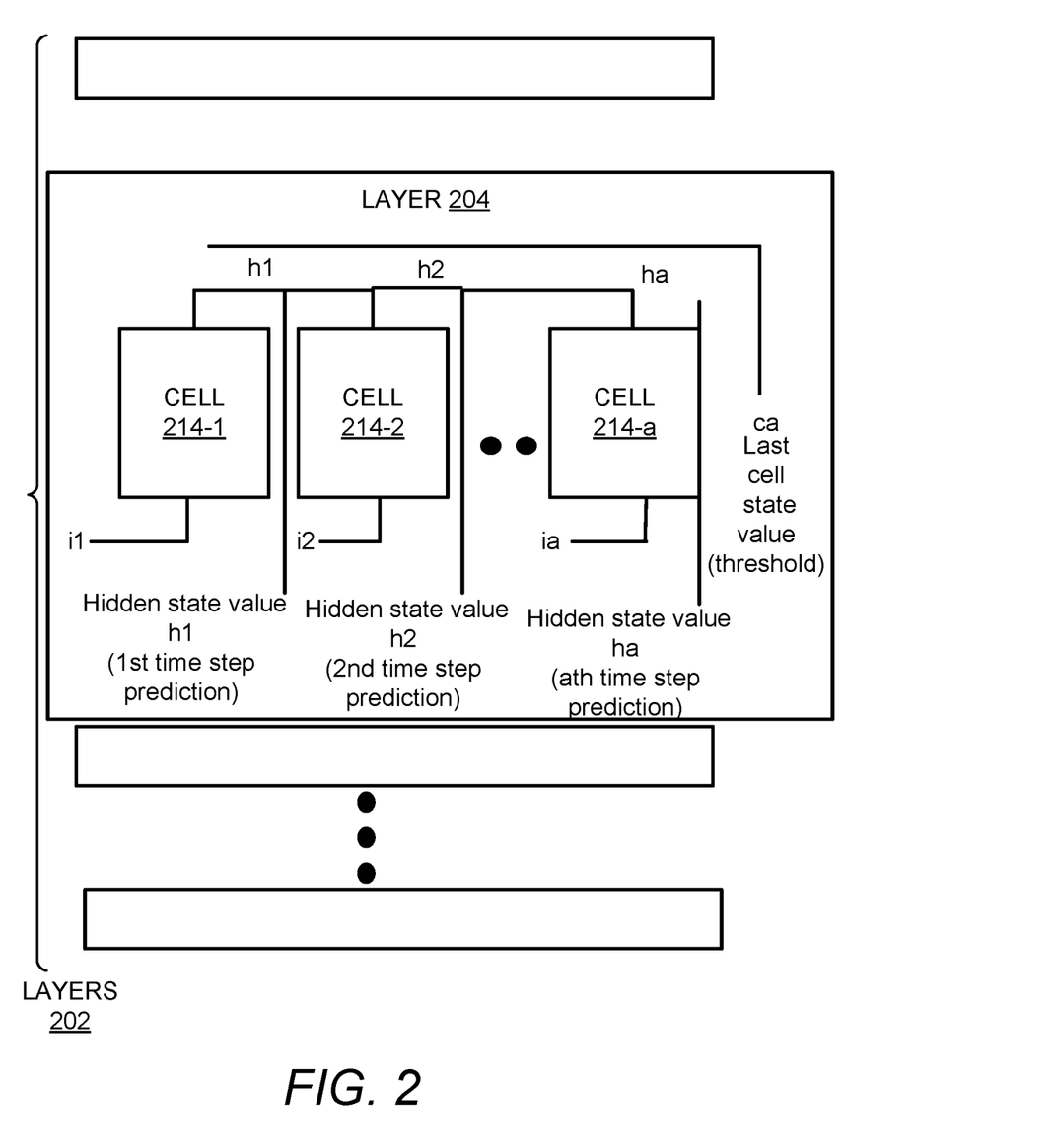
FIG. 2 shows a block diagram of a usage prediction model which includes a Long Short-Term Memory (LSTM) network in accordance with the examples disclosed herein.

FIG. 2 shows a block diagram of the usage prediction model 104 which includes a LSTM neural network 200 in accordance with the examples disclosed herein. The LSTM neural network 200 can include a plurality of layers 202 wherein each of the layers e.g., layer 204 includes memory cells such as the memory cells 214-1, 214-2 . . . 214-a (where 'a' is a natural number). The number of layers is one of the hyper parameters for the usage prediction model 104 and can be determined by empirical methods by trying out different number of layers to identify a number that gives the most accurate result. The number of memory cells in the LSTM layer 204 'a' can be user-configurable. In the present scenario wherein the LSTM neural network 200 is implemented as the usage prediction model 104, the number of cells 'a' is determined by the number of time steps at which the user desires to receive power usage predictions within a given time interval. The user 150 can provide the number of time steps as part of the configuration input 152. For example, if the user 150 configured the prediction system 100 for generating the predicted values every 3 hours, then each layer would have 8 cells within a 24 hour interval. If, however, the user 150 configured the prediction system 100 for generating the predicted values every 1 hour within a 24 hour interval, then each layer would have 24 cells. Of course, these values may be increased or decreased based on the user adjustment of network feedback and evaluation.

The LSTM neural network 200 has the ability add or to remove the information to the cell state as regulated by structures called gates. Gates enable to optionally let information pass through different cells/cells states. As a result, the LSTM neural network 200 has a property of selectively remembering patterns for long durations of time. The gates include an input gate, an output gate and a forget gate. The memory cells 214-1, 214-2 . . . 214-a thus retain values over arbitrary time intervals. The three gates regulate the flow of information into and out of the memory cells 214-1, 214-2 . . . 214-a. The cell state is, therefore, a selective memory of the past while the hidden state of a cell carries information received by the cell over a period of time and supplies to the current time step.

Each of the cells 214-1, 214-2 . . . 214-a therefore has an internal cell state represented, for example, as "c" and outputs a hidden state represented as "h". Alternately, the hidden state (h) is the output of an LSTM cell or layer of cells while the internal state of the LSTM cell which is not output is represented as the cell state or "c". Each LSTM cell can output one hidden state h for each received input, represented herein as "i". For each of the inputs i1, i2 . . . ia, the cells 214-1, 214-2 . . . 214-a, output corresponding hidden state values h1, h2 . . . ha at user-defined time steps t1, t2 . . . ta. Additionally, a cell state 'ca' is also generated for the last input time step.

When implemented as the usage prediction model 104, the LSTM neural network 200 receives as input, the current power usage data 'i1' of the plurality of devices 114-1, 114-2 . . . 114-n at a user defined time interval T1 which can include the user defined time steps t1 . . . ta. The memory cells 214-1, 214-2 . . . 214-a output a series of hidden state values h1, h2 . . . ha at the user defined time step t1 in response to receiving the power usage data input cit. The last cell state value 'ca' that is generated can include selective memory of prior power usage readings. The last cell state value 'ca' can be employed as the power consumption threshold 162 which is indicative as the maximum value that any of the hidden state values h1, h2 . . . ha may take i.e., the maximum value of power consumption at any given hour while avoiding the power usage condition.

For example, if the user 150 desires to monitor hourly power consumption of the devices 114-1 . . . 114-n, with predictions for the next 3 hours, then the power data consumed is received every hour as an input to the LSTM neural network 200. In response to receiving the input, a sequence of three predicted values can be generated for power consumption every hour. The sequence of the three predicted values are compared with a last cell state or the power consumption threshold 162 that was set based on the user's configuration input 152. If the sequence of the three predicted values remain within the power consumption threshold 162, or within the value of the last cell state 'ca', then no action is required. If one or more of the sequence of the three predicted values fails to comply with the power consumption threshold 162 i.e., the last cell state 'ca', then one of the power usage conditions can be determined based on the number of deviating values. Accordingly, the power usage condition can be defined as:

$$\text{Hidden State(Any Value)} > \text{Cell State} \quad \text{Eq. (1)}$$

While the input, output and the cell state values can be calculated as:

$$C<t> = U*C'<t> + F*C<t-1> \quad \text{Eq. (2)}$$

where $C'<t> = \tan h(Wa[a<t-1>, X<t>] + bc)$ Eq. (3)

C<t>=current cell state, U=update gate, F=forget gate, C<t-1>=previous cell state, a<t-1>=output at previous step and X<t>=input at current step. Eq. (2) combines an input gate layer that identifies values to be updated with the tan h layer that creates a vector of the new candidate values thereby creating an update to the state. When the user 150 updates the power consumption threshold 162, then such user input is transmitted to the LSTM neural network 200 to adjust the last cell state value 'ca'.

Figure 3:
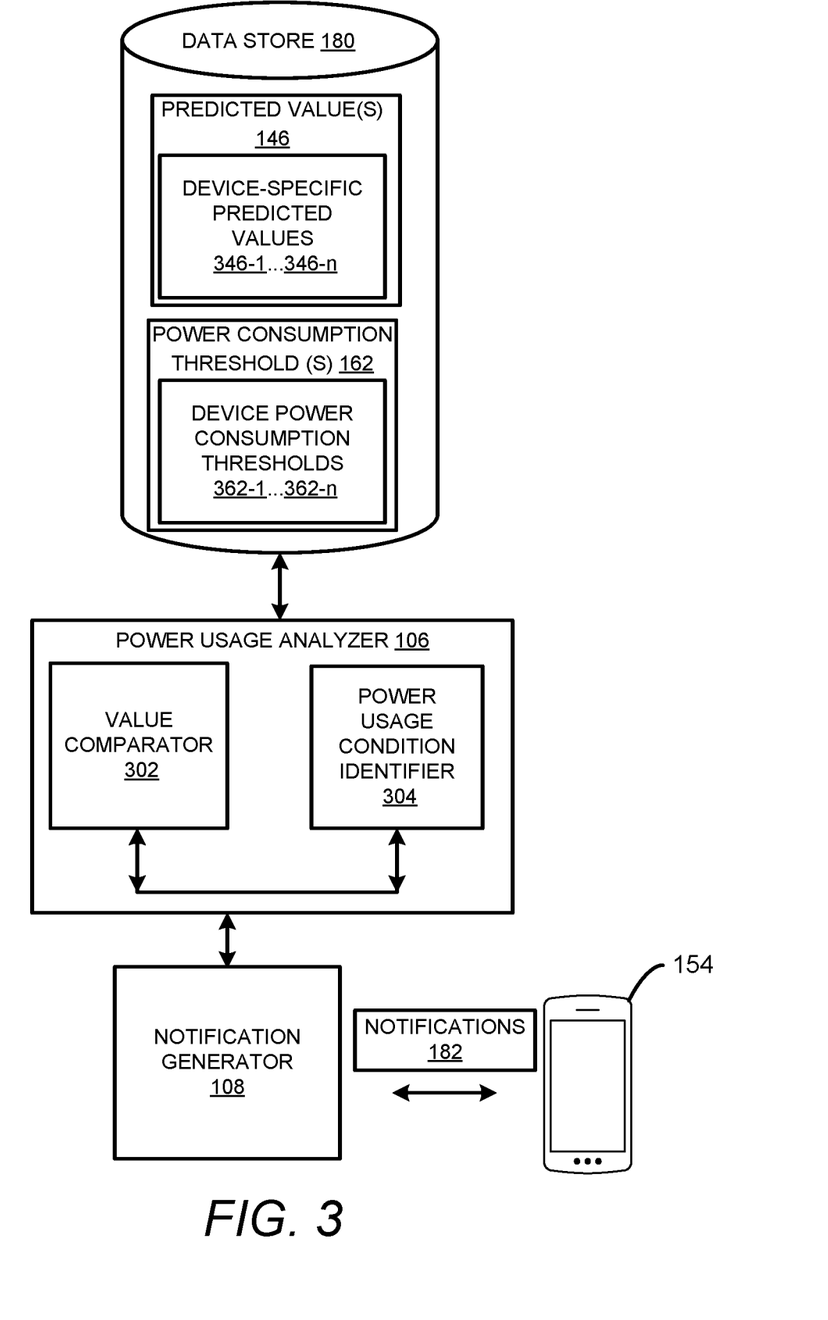
FIG. 3 shows a block diagram of a power usage analyzer and a notification generator in accordance with the examples disclosed herein.

FIG. 3 shows a block diagram of the power usage analyzer 106 and notification generator 108 in accordance with the examples disclosed herein. The power usage analyzer 106 includes a value comparator 302 and a power usage condition identifier 304. The predicted values 146 and the power consumption threshold 162 are accessed by the value comparator 302. The predicted values 146 can include multiple values generated over multiple time steps. The value comparator 302 can compare each of the multiple values to the power consumption threshold 162. In an example, the power data inputs from each of the plurality of devices 114-1 . . . 114-n can also be individually analyzed. As each device has its own power consumption data, the predicted value(s) 146 can be aggregates of the power consumption predictions of all the plurality of devices 114-1 ... 114-n. The predicted value(s) 146 can therefore be analyzed to identify the portion of the predicted power consumption value(s) 146 that can be ascribed to each of the plurality of devices 114-1 ... 114-n. For example, the power data inputs from each of the devices as a percentage of the total power data input from the plurality of devices 114-1 ... 114-n can be identified. The portions of the predicted values 146 can be ascribed to each device in proportion to its power data input.

Each time one value of the series of predicted values 146 fails to meet the corresponding power consumption threshold 162, the data or the particular predicted value is transmitted to the power usage condition identifier 304. The power usage condition identifier 304 can be configured to cache the incoming predicted values that failed to meet the power consumption threshold 162 for a given time interval. When a certain percentage of the predicted values fail to meet the corresponding threshold within a particular time interval then a power usage condition is recorded. If 20-50% of the predicted values 146 (i.e., the hidden state values of the LSTM neural network) are greater than the cell state threshold then a start power usage condition is recorded. If 50-80% of the predicted values 146 are greater than the cell state threshold then a high power usage condition is recorded. If 80% or higher number of the predicted values 146 are greater than the cell state threshold then an extreme power usage condition is recorded.

In an example, different LSTM networks can be trained for home/establishment 110 level and at individual device levels. Accordingly, the power usage condition analysis can be extended to individual equipment also. Therefore, a plurality of LSTM networks can be associated with the establishment 110 to monitor the power consumption of the devices 114-1 ... 114-n. The portions of the predicted values 146 that are ascribed to each device in proportion to its power data input can be termed as device-specific predicted values 346. The device specific predicted values 346-1 ... 346-n generated by the plurality of LSTM networks can be compared to a corresponding device power consumption thresholds 362-1 ... 362-n. The device power consumption thresholds 362-1 ... 362-n can be defined for each of the plurality of device classes and generated as the last cell state values of the corresponding ones of the plurality of LSTM networks. The device(s) which do not meet the device power consumption thresholds 362-1 ... 362-n of the corresponding device class/classes and hence which are contributing to the power usage conditions can thus be isolated.

In the above example it is assumed that each of the plurality of devices 114-1 ... 114-n belongs to a respective device class. Of course, that may not be the case at all times. There can be examples where the plurality of devices 114-1 ... 114-n include multiple devices belonging to the same device class. For example, an establishment may have many LEDs or multiple refrigerators, air conditioners (ACs) etc. In this instance, separate device specific predicted values can be obtained for each of the devices belonging to the same device class so that the particular device may be contributing to the power usage condition is identified. In an example, the predicted values 146 can be aggregates of the device specific predicted values 346-1 ... 346-n. The aggregates can be generated by Artificial Intelligence (AI) scripting (any language) and based upon individual scenarios.

The notification generator 108 is configured to send out notifications 182 to the client device 154 and/or update the dashboards etc. in response to the detection of the power usage conditions. The notifications 310 can enable different functionalities based on the type of power usage conditions. In an example, if a high power usage condition is detected for one or more devices, the notification can include a widget which enables remotely switching off the device.

Figure 4:
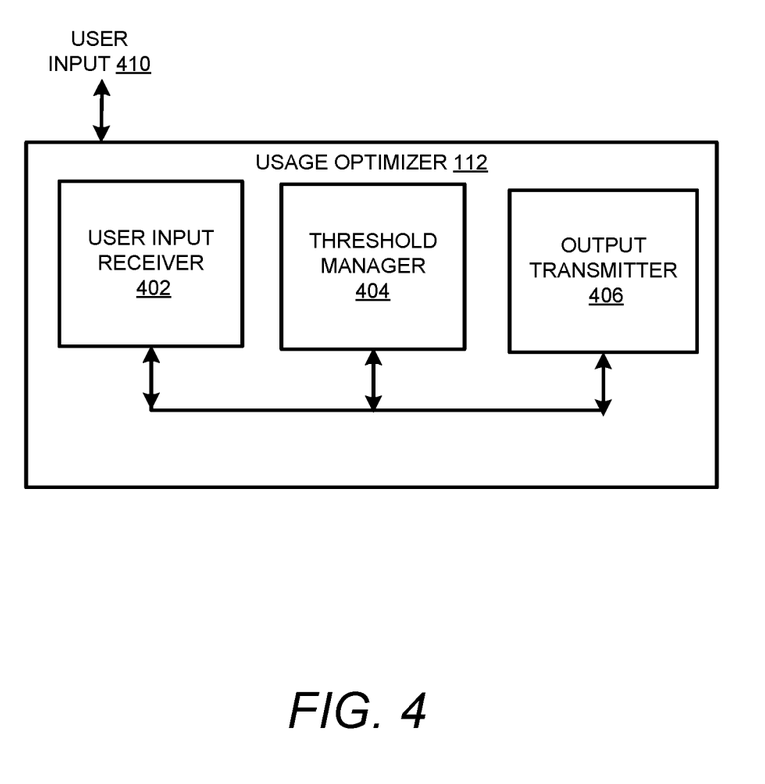
FIG. 4 shows a block diagram of a usage optimizer in accordance with the examples disclosed herein.

FIG. 4 shows a block diagram of the usage optimizer 112 in accordance with the examples disclosed herein. Based on the notifications 310 which are received or which are accessed via a dashboard, the user 150 can take different actions. The user 150 in some instances may choose to ignore or not take any action in response to the notification of certain power usage conditions such as an early power usage condition associated with an AC in summer season. In some instances, the user 150 may choose to adjust either the power consumption threshold 162 associated with the plurality of devices 114-1 ... 114-n or to adjust one or more of the device power consumption thresholds 362-1 ... 362-n associated with one or more of the plurality of devices 114-1 ... 114-n and the adjusted power consumption thresholds are used subsequently in determining the power usage conditions. In yet other instances where the power consumption threshold 162 or one or more of the power consumption thresholds 362-1 ... 362-n is rapidly reaching extreme power usage conditions, the user 150 may choose to shut off one or more of one or more of the plurality of devices 114-1 ... 114-n.

The user input receiver 402 of the usage optimizer 112 receives the user input 410 corresponding to the above mentioned user actions. Based on the type of input one or more of the threshold manager 404 or the output transmitter 406 can be activated. In an example, if the user 150 chooses to ignore the notification 310, then such event may be recorded as part of the training data 120 for further training of the usage prediction model 104. If the user 150 selects to adjust one or more of the power consumption threshold 162 or one or more of the device power consumption thresholds 362-1 ... 362-n, the usage prediction model 104 can be trained to use the updated thresholds. Therefore, the corresponding cell states within the LSTM neural network 200 are adjusted based on the user input. On the other hand, if the user 150 selects to switch off or otherwise manipulate one or more of the plurality of devices 114-1 ... 114-n, then the output transmitter 406 transmits the signal to shut down the corresponding device(s).

Figure 5:
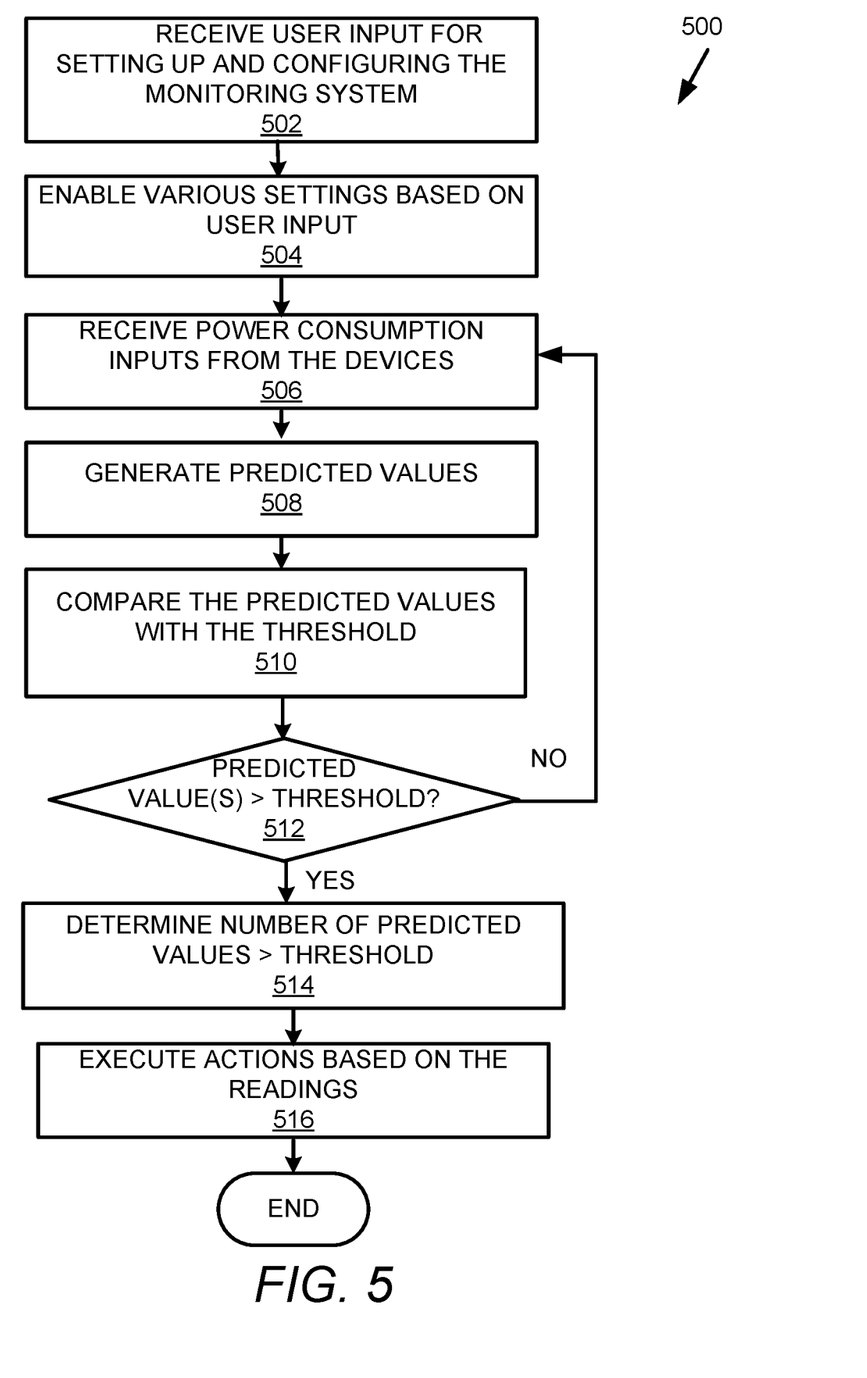
FIG. 5 is a flowchart that details a method of monitoring power consumption accordance with examples disclosed herein.

FIG. 5 is a flowchart 500 that details a method of monitoring power consumption accordance with examples disclosed herein. The method begins at 502 wherein the user input for setting up and configuring the power usage prediction system 100 to monitor power consumption of the plurality of devices 114-1 ... 114-n is received. Various attributes of the devices such as but not limited to, the device network identifiers, the amount of usage or power consumed in a given time interval and the time of high usage for each of the plurality of devices 114-1 ... 114-n which can enable the prediction system 100 to set up the device power consumption thresholds and their associated timings etc. can be entered by the user 150 via the input UIs 142. Similarly the personalized settings within the prediction system 100 such as language, timing, format and the client device(s) at which the notifications are to be received, the settings for the dashboards, the security settings including user names, passwords etc. can also be entered at 502. At 504 the prediction system 100 enables various settings based on the user input received at 502. As mentioned above, the number of layers within the LSTM neural network 200, the number of cells within the LSTM neural network 200, the frequency of producing the predicted power consumption readings etc.

can also be enabled at 504. At 506, the prediction system 100 is enabled and begins to receive power usage inputs or current power consumption data from the plurality of devices 114-1 . . . 114-n which are now communicatively coupled via the network 170. The power consumption data is received at particular time steps as set up based on the user settings received at 502.

At 508, the predicted values 146 corresponding to the received power usage input are generated. More particularly, the predicted values 146 include a series of values for projected power usages at different time steps as set up by the user 150. The predicted values 146 are compared with the corresponding threshold at 510. The comparisons at 510 can include total power consumption predicted for the plurality of devices 114-1 . . . 114-n in a given time interval being compared with the power consumption threshold 162. Based at least on the comparisons at 510, it is determined at 512 if at least one of the predicted values 146 exceeds the power consumption threshold 162. If it is determined at 512 that even one of the predicted values 146 does not exceed the power consumption threshold 162, the method returns to block 506 to continue receiving the device power inputs. If it is determined at 512 that one or more of the predicted values exceeds the threshold the method moves to 514 to determine the number of predicted values that exceed the power consumption threshold 162 in order to identify the type of power usage condition. At 516, one or more actions as detailed herein can be executed based on the type of power usage condition identified at 514. For example, if it is an early power usage condition, the user may receive an ordinary notification or even choose to ignore the power usage condition. However, if it is an extreme power usage condition, the user may require an urgent notification in order to take action such as remotely switching off the particular device(s) which may be causing the extreme power usage condition.

Figure 6:
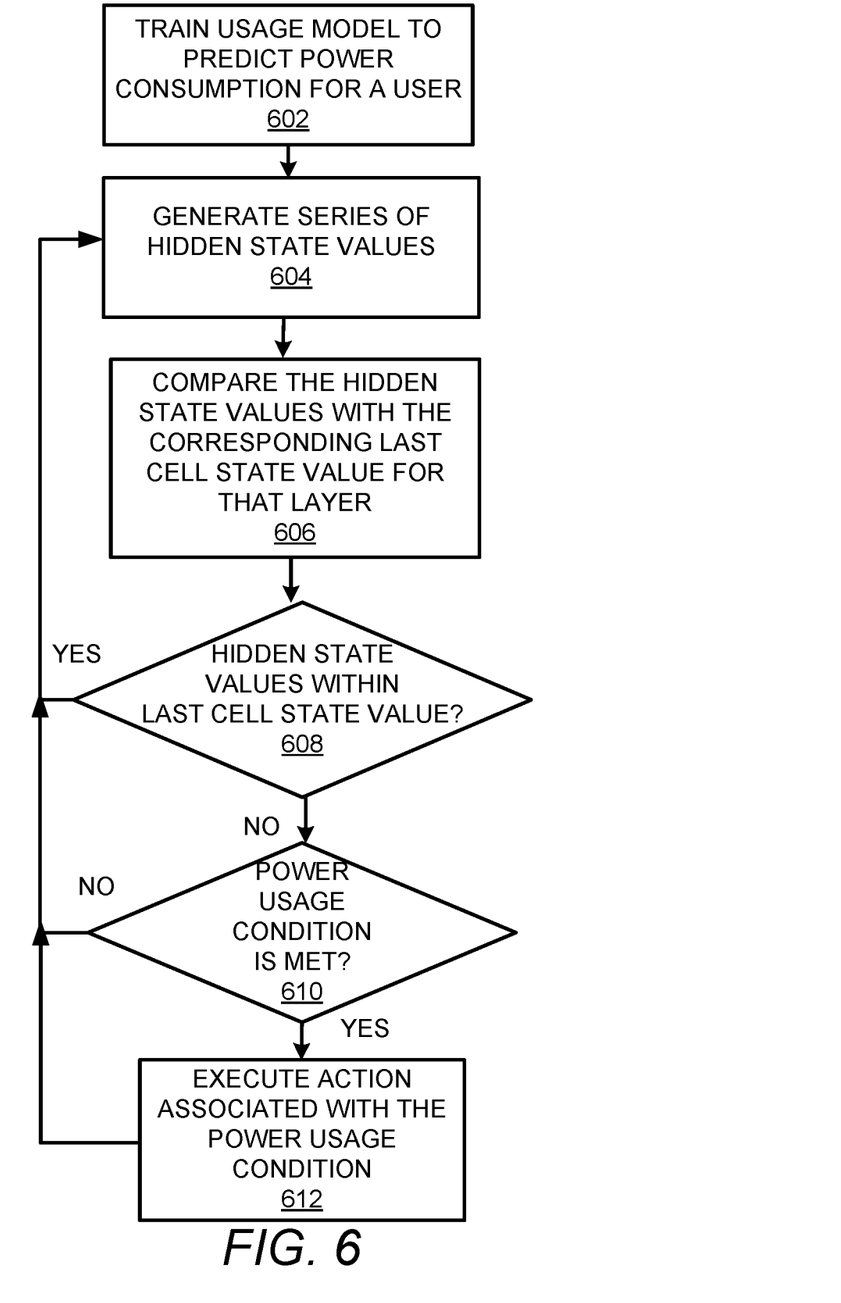
FIG. 6 shows a flowchart that details a method of generating predicted values for the power consumption in accordance with the examples disclosed herein.

FIG. 6 shows a flowchart that details a method of generating power consumption predictions or the predicted values in accordance with the examples disclosed herein. The method begins at 602 wherein the usage prediction model 104, which in accordance with an example can be implemented with the LSTM neural network 200, is trained by accessing the training data 120 to generate predictions regarding the power consumption of various users. In an example, the training data can include historical power consumption data including the number of units of power consumed by a plurality of device classes at time steps included in various time intervals at each month of the year over the previous several years. Accordingly, the time steps can be selected from time intervals during various parts of the day such as 6.00 AM-9.00 AM or 9.00 AM-12. AM or 9.00 PM-12.00 PM etc. At 604, a series of predicted values for the power consumption of the user 150 are generated for a time step in accordance with the user's input. More particularly, hidden state values of the cells 214-1 . . . 214-a within the LSTM layer 204 corresponding to the time steps t1 . . . to are output at 604. At 606, the generated predicted values are compared with the corresponding power consumption threshold or the last cell state of the LSTM layer 204. At 608, it is determined if the hidden state values at 604 are within the threshold or the last cell state. If yes, the method returns to 604 to obtain the predicted values or the hidden state values for a subsequent time interval. If it is determined at 608 that one or more of the hidden state values exceeds the last cell state, the predicted value(s) exceeding the threshold value are recorded for a power usage condition. At 610, it is determined if the number of predicted values that exceed the power consumption threshold 162 within a time interval meet the requirements for one of the power usage conditions as detailed above. If one of the power usage conditions is met at 610, then the action associated with the power usage condition is executed at 612. If, at 610, it is determined that the number of predicted values that exceed the threshold for the time steps within a time interval do not meet the requirements for even one of the power usage conditions, the method again returns to 604 to produce predicted values for the power consumption of the user 150 for the next time interval.

Figure 7:
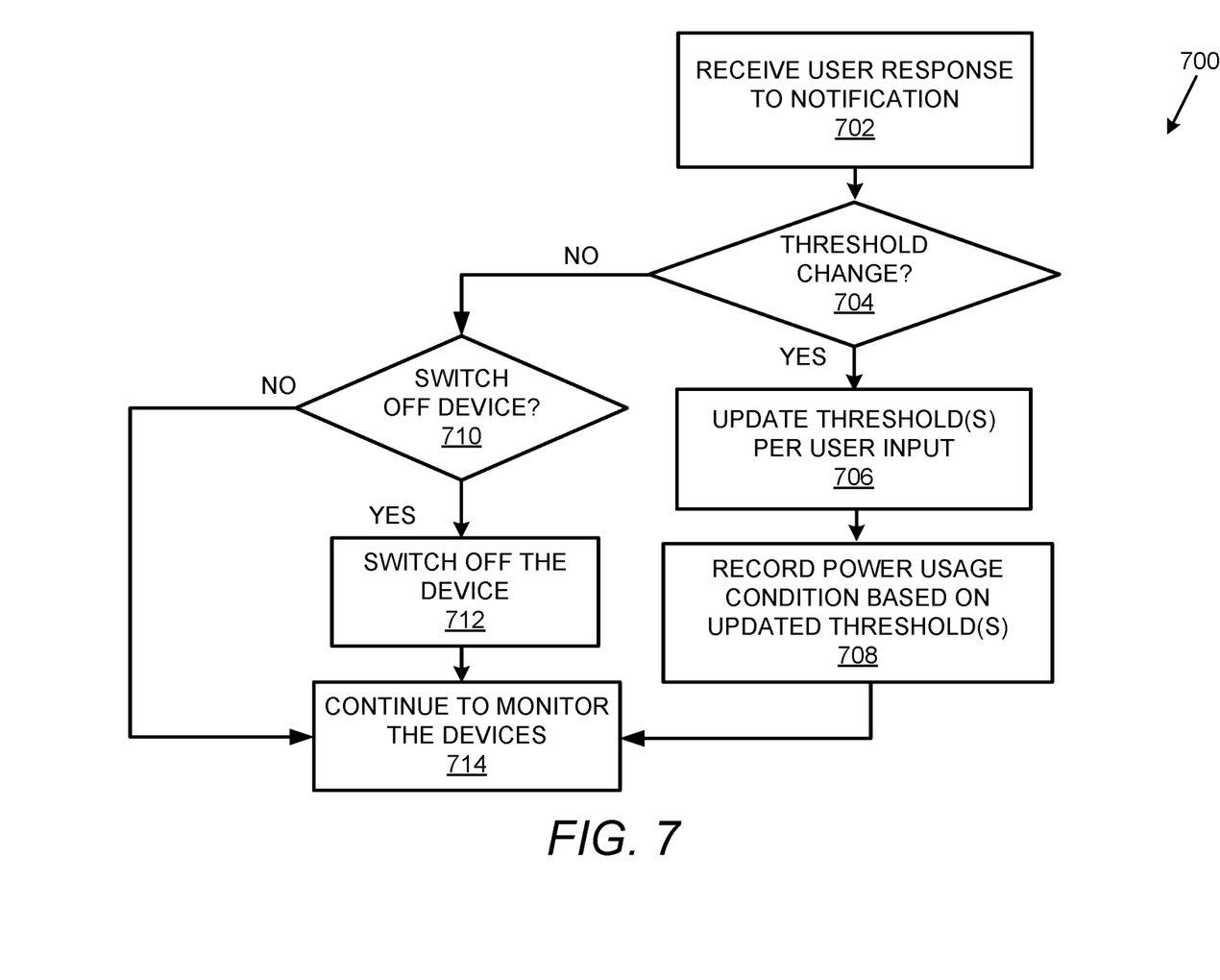
FIG. 7 shows a flowchart that details a method of managing the power consumption thresholds in accordance with the examples disclosed herein.

FIG. 7 shows a flowchart 700 that details a method of managing the power consumption thresholds in accordance with the examples disclosed herein. The method begins at 702 wherein the user input or user response to the notification 182 regarding the power usage condition is received. At 704 it is determined if the user 150 has changed one or more thresholds associated with the notification. The user 150 can change the power consumption threshold 162 or the user can change one or more device power consumption thresholds 362-1 . . . 362-n. For example, if the user 150 is expecting heavy usage of one or more devices, such as, the AC during summer or the heater during winter etc. the user 150 can change the device power consumption thresholds associated with those devices. Similarly the user 150 can change the power consumption threshold 162 of the plurality of devices 114-1 . . . 114-n within a given time interval. It can be appreciated that the threshold adjustments may either increase the power consumption thresholds or decrease the power consumption thresholds. If at 704 it is determined that the user 150 has changed one or more thresholds, then the thresholds are updated at 706 based on the user input. The power usage conditions are recorded at 708 based on the new or the updated thresholds at 708 and the prediction system 100 continues to monitor the plurality of devices 114-1 . . . 114-n at 714.

If, at 704, it is determined that the user has not adjusted the threshold, then it is determined at 710 if a signal is received for switching off one or more devices. If the signal to switch off one or more devices is received at 710 then the devices identified in the user response are switched off remotely at 712 and the prediction system 100 continues to monitor the plurality of devices 114-1 . . . 114-n at 714. If at 710 it is determined that no signal to switch off devices is received, then the power usage condition is continued to be monitored at 714. In an example, the power usage may fall back to within the threshold(s). In an example, the power usage condition may continue to escalate from early shock to high shock or further to the extreme power usage condition. Based on the rate of escalation, another urgent notification can be sent to the user 150 and if the user responds, the action in the user response is executed. If the user 150 does not respond to the second/urgent notification, the device(s) exceeding their corresponding device power consumption threshold(s) and contributing to the extreme power usage condition can be automatically switched off by the prediction system 100.

Figure 8:
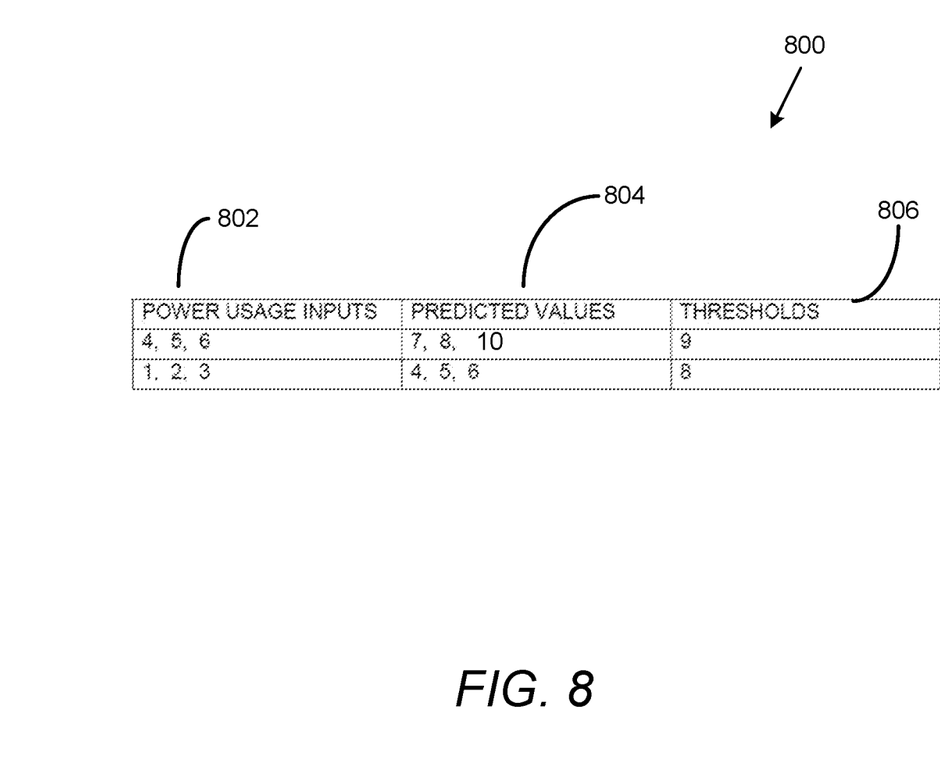
FIG. 8 shows a table with a series of sample power usage inputs, the predicted values and the associated thresholds in accordance with the examples disclosed herein.

FIG. 8 shows a table 800 with a series of sample power usage inputs 802, the predicted values 804 generated for the power usage inputs 802 and the associated thresholds 806 in accordance with the examples disclosed herein. The power usage inputs 802 are received in a series of user-configured time steps. The predicted values 804 are the hidden state values that different cells within a layer generate for the received power usage inputs. Each of the predicted values corresponds to a time step in the series of the user-configured time steps within a given time interval. For example, the time steps can correspond to every one hour within a time interval of three hours. Each of the predicted values 804 is compared with the corresponding threshold (i.e., the cell state of the last cell within the layer) for detecting a power usage condition. For example, each of the predicted values 4, 5 and 6 is compared with the threshold 8 and since none of the predicted values exceeds the threshold, none of the readings are recorded for the power usage condition. However, for the power usage inputs 4, 5, 6, the predicted value 10 exceeds the corresponding threshold 9. As 10 is one reading in three readings within the time interval, 30% of the readings exceed threshold and accordingly, an early power usage condition may be registered for the time interval in which the three values 7, 8, 10 were generated.

In an example, the predicted values associated with the total power consumption for the plurality of devices 114-1 . . . 114-n can be further analyzed to determine one or more of the plurality of devices 114-1 . . . 114-n with high power consumption trends that are causing the prediction system 100 to indicate a high shock or an extreme power usage condition. The analysis can include identifying device-level predicted values that are exceeding the corresponding device power consumption thresholds. Isolating the individual devices can enable the user 150 to take an action to mitigate high power consumption such as lowering the power usage of the device or may even prevent an accident.

Figure 9:
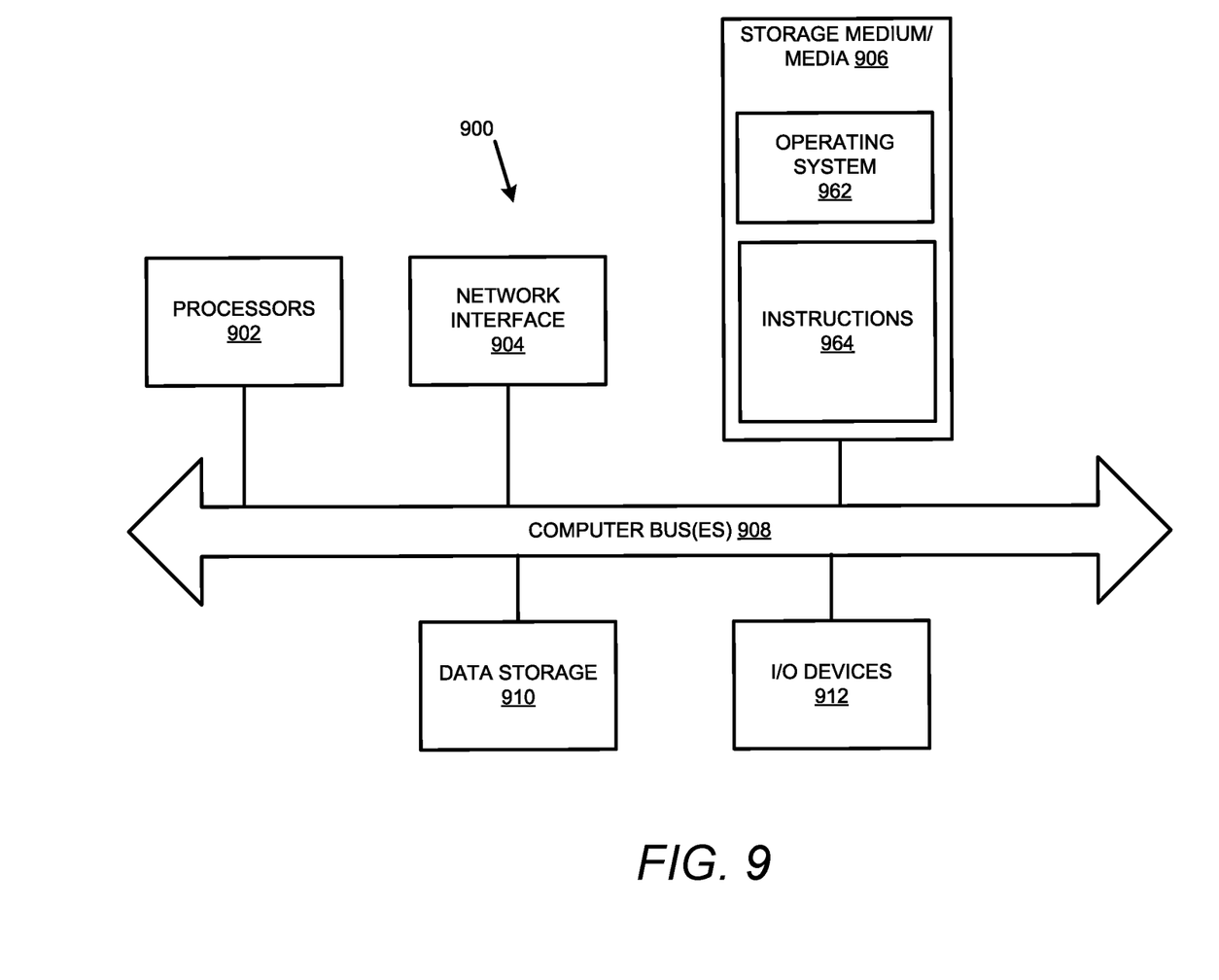
FIG. 9 illustrates a computer system that may be used to implement the prediction system in accordance with examples disclosed herein.

FIG. 9 illustrates a computer system 900 that may be used to implement the prediction system 100. More particularly, computing machines such as desktops, laptops, smartphones, tablets and wearables which may be used to generate or access the data from the prediction system 100 may have the structure of the computer system 900. The computer system 900 may include additional components not shown and that some of the components described may be removed and/or modified. In another example, a computer system 900 can be hosted on external-cloud platforms such as, Amazon Web Services, or internal corporate cloud computing clusters, or organizational computing resources, etc.

The computer system 900 includes processor(s) 902, such as a central processing unit, ASIC or other type of processing circuit, input/output devices 912, such as a display, mouse keyboard, etc., a network interface 904, such as a Local Area Network (LAN), a wireless 802.11x LAN, a 3G or 4G mobile WAN or a WiMax WAN, and a computer-readable medium 906. Each of these components may be operatively coupled to a bus 908. The computer-readable medium 906 may be any suitable medium which participates in providing instructions to the processor(s) 902 for execution. For example, the computer-readable medium 906 may be non-transitory or non-volatile medium, such as a magnetic disk or solid-state non-volatile memory or volatile medium such as RAM. The instructions or modules stored on the computer-readable medium 906 may include machine-readable instructions 964 executed by the processor(s) 902 to perform the methods and functions of the prediction system 100.

The prediction system 100 may be implemented as software stored on a non-transitory computer-readable medium and executed by the one or more processors 902. For example, the computer-readable medium 906 may store an operating system 962, such as MAC OS, MS WINDOWS, UNIX, or LINUX, and code 964 for the prediction system 100. The operating system 962 may be multi-user, multi-processing, multitasking, multithreading, real-time and the like. For example, during runtime, the operating system 962 is running and the code for the prediction system 100 is executed by the processor(s) 902.

The computer system 900 may include a data storage 910, which may include non-volatile data storage. The data storage 910 stores any data used by the prediction system 100. The data storage 910 may be used to store the user settings for the prediction system 100, the predicted values of power consumption, the thresholds, the notifications sent to the user upon detecting the power usage conditions and the user response to the notifications etc.

The network interface 904 connects the computer system 900 to internal systems for example, via a LAN. Also, the network interface 904 may connect the computer system 900 to the Internet. For example, the computer system 900 may connect to web browsers and other external applications and systems via the network interface 904.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. A power usage prediction system comprising:
   at least one processor;
   a non-transitory computer readable medium storing machine-readable instructions that cause the at least one processor to:
   access power consumption data, the power consumption data including power consumed by one or more devices at each of a plurality of time steps included within a time interval;
   generate, using a long short term memory (LSTM) neural network, a hidden state value for each stage of the LSTM neural network as predicted values for power consumption for the one or more devices at each of the plurality of time steps, wherein a number of cells in each stage of the LSTM neural network corresponds to a number of the plurality of time steps included within the time interval;
   compare each of the hidden state values with a final cell state value for a final stage of the LSTM neural network corresponding to a power consumption threshold wherein the power consumption threshold corresponds to the time interval including the plurality of time steps;
   predict one or more of a plurality of power usage conditions for the devices based on comparison of the hidden state values with the final cell state value;
   transmit a power consumption alert to one or more client devices based on a selected one of the plurality of power usage conditions;
   receive a user input in response to the power consumption alert, wherein the user input alters the number of time steps within the time interval for the generation of the predicted values of the power consumption;
   alter, based on the user input, information flow through the cells in each stage of the LSTM neural network using gates in the LSTM;
   alter the number of cells in each stage of the LSTM neural network in accordance with the user input, wherein the number of cells in each stage are altered by the information flow through the LSTM network; and
   predict the power usage conditions for the devices based on the hidden state values of the LSTM neural network with the altered number of cells.

2. The prediction system of claim 1, where the instructions for transmitting the power consumption alert comprise further instructions that cause the processor to:
 transmit the power consumption alert when an extreme power usage condition or a high power usage condition is selected from the plurality of power usage conditions that also include a start power usage condition, wherein the extreme power usage condition is selected when 80% or more of the hidden state values are greater than a power consumption threshold of the corresponding time interval and the high power usage condition is detected when 50%-80% of the hidden state values generated by the cells in each stage are greater than the power consumption threshold of the corresponding time interval.

3. The prediction system of claim 2, where the instructions for comparing each of the hidden state values of the devices with the power consumption threshold further includes:
 analyzing, from the hidden state values, one or more of the devices with power consumption causing the selection of the extreme power usage condition or the high power usage condition.

4. The prediction system of claim 1, where the non-transitory computer readable medium comprises further instructions that cause the processor to:
 adjust the power consumption threshold based on the user input, the adjustment including moving the power consumption threshold so that the hidden cell state values fall within the power consumption threshold.

5. The prediction system of claim 4, where the non-transitory computer readable medium comprises further instructions that cause the processor to:
 train the LSTM neural network on further training data for generating the hidden state values regarding the power consumption of each of a plurality of device classes at each of the plurality of time steps where the further training data is based on the adjusted power consumption threshold;
 generate further hidden state values for subsequent time steps;
 compare each of the further hidden state values for the subsequent time steps with the adjusted power consumption threshold; and
 select one of the plurality of power usage conditions for the devices based on comparison of the further hidden state values with the adjusted power consumption threshold.

6. The prediction system of claim 1, where the non-transitory computer readable medium comprises further instructions that cause the processor to:
 transmit a signal to at least one of the devices, where the signal powers off the at least one device, the signal being transmitted based on the user input.

7. The prediction system of claim 6, where the non-transitory computer readable medium comprises further instructions that cause the processor to:
 provide as feedback training to the LSTM neural network, the user input to lower the power usage of the at least one device.

8. The prediction system of claim 1, where the instructions for generating the power consumption predictions using the LSTM neural network comprise further instructions that cause the processor to:
 provide as inputs to a plurality of the cells in the LSTM neural network, current power consumption data as obtained from the one or more devices for at least one of the time steps.

9. The prediction system of claim 8, where the instructions for generating the power consumption predictions using the LSTM neural network comprise further instructions that cause the processor to:
 receive as outputs from the plurality of cells, the hidden state values.

10. The prediction system of claim 8, where the plurality of cells correspond to the plurality of time steps at which the hidden state values are generated and the final cell state value stores selective memory of prior power usage readings.

11. The prediction system of claim 1, where the non-transitory computer readable medium comprises further instructions that cause the processor to:
 train the LSTM neural network based on historical power consumption data.

12. The prediction system of claim 1, where the non-transitory computer readable medium comprises further instructions that cause the processor to:
 receive, via an input user interface (UI), configuration input for the prediction system from the user, wherein the configuration input includes user selected values for the plurality of time steps, network identifiers of devices and client devices at which to receive notifications.

13. The prediction system of claim 1, wherein the one or more devices are connected via an Internet of Things (IoT) network.

14. A method of generating power consumption predictions comprising:
 configuring a final cell state value of a plurality of cells in a layer of a long short term memory (LSTM) neural network as a power consumption threshold corresponding to a time interval where the time interval further includes a plurality of time steps, wherein a number of the plurality of cells in each layer of the LSTM neural network corresponds to a number of the plurality of time steps included within the time interval;
 providing as inputs to the plurality of cells of the LSTM neural network, current power consumption data of one or more devices at a current time step, where the devices are a connected to a communication network;
 accessing hidden state values generated by the plurality of cells in response to the inputs, where the hidden state values correspond to predicted values of power consumption for the one or more devices at each of the plurality of time steps;
 comparing each of the hidden state values with the final cell state value of the time interval;
 predicting one of a plurality of power usage conditions for the devices based on the comparison of each of the hidden state values with the final cell state value;
 transmitting a power consumption alert to one or more client devices based on the selection of one of the power usage conditions;
 receiving a user input in response to the power consumption alert, wherein the user input alters the number of time steps within the time interval for the generation of the predicted values of the power consumption;
 altering, based on the user input, information flow through the plurality of cells in each layer of the LSTM neural network using gates in the LSTM;

altering the number of the cells in each layer of the LSTM neural network in accordance with the user input, wherein the number of the cells are altered by the information flow through the LSTM network; and predicting the power usage conditions for the devices based on the hidden state values of the LSTM neural network with the altered number of the cells.

15. The method of claim 14, further comprising:
receiving, as a configuration input from an entity, the power consumption threshold for the time interval.

16. The method of claim 14, wherein selecting one of the plurality of power usage conditions further comprises:
selecting one of an extreme power usage condition, a high power usage condition and a start power usage condition based on the comparison, wherein the extreme power usage condition, is selected in response to determining that 80% or more of the hidden state values generated by the plurality of cells for the devices for the subsequent time steps are greater than the power consumption threshold of the corresponding time interval, the high power usage condition, is selected in response to determining that 50%-80% of the hidden state values generated by the plurality of cells for the devices for the subsequent time steps are greater than the power consumption threshold of the corresponding time interval, and the start power usage condition, is selected in response to determining that 20%-50% of the hidden state values generated by the plurality of cells for the devices for the subsequent time steps are greater than the power consumption threshold of the corresponding time interval.

17. A non-transitory computer-readable storage medium comprising machine-readable instructions that cause a processor to:

access power consumption data including power consumed by one or more devices at each of a plurality of time steps where the plurality of time steps are included within a time interval, wherein a number of cells in each stage of the LSTM neural network corresponds to a number of the plurality of time steps included within the time interval;

generate, using the a long short term memory neural (LSTM) network, a hidden state value for each stage of the LSTM neural network as predicted values for power consumption for the one or more devices at each of the plurality of time steps;

compare each of the hidden state values with a final cell state value for a final stage of the LSTM neural network corresponding to a power consumption threshold wherein the power consumption threshold corresponds to the time interval including the plurality of time steps;

predict one or more of a plurality of power usage conditions for the devices based on comparison of the hidden state values with the final cell state value;

transmit a power consumption alert to one or more client devices of an entity based on the selected one of the plurality of power usage conditions;

receive a user input in response to the power consumption alert, wherein the user input alters the number of time steps within the time interval for the generation of the predicted values of the power consumption;

alter, based on the user input, information flow through the cells in each stage of the LSTM neural network using gates in the LSTM;

alter the number of cells in each stage of the LSTM neural network in accordance with the user input, wherein the number of cells in each stage are altered by the information flow through the LSTM network; and predict the power usage conditions for the devices based on the hidden state values of the LSTM neural network with the altered number of cells.

18. The non-transitory computer-readable storage medium of claim 17, comprising further instructions that cause the processor to:
receive user input for further analysis regarding the predicted power usage condition; and
identifying, one or more of the devices causing the predicted power usage condition.

19. The non-transitory computer-readable storage medium of claim 18, comprising further instructions that cause the processor to:
remotely switch off the one or more devices causing the predicted power usage condition based on the user input.

* * * * *

UNITED STATES PATENT AND TRADEMARK OFFICE
CERTIFICATE OF CORRECTION

PATENT NO.         : 11,025,061 B2
APPLICATION NO.    : 16/368279
DATED              : June 1, 2021
INVENTOR(S)        : Paresh Khanna et al.

Page 1 of 1

It is certified that error appears in the above-identified patent and that said Letters Patent is hereby corrected as shown below:

In the Claims

In Column 15, Line 30, Claim 4, the word "cell" should be deleted.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*